Figure 1:
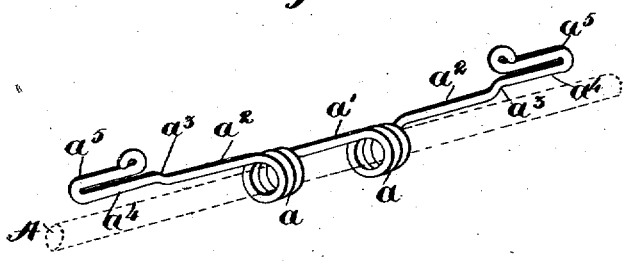

G. W. McCOOLE.

CLOTHES PIN.

No. 11,358. Reissued Aug. 15, 1893.

Witnesses

James J. O'Donohoe

Jno. B. Dempsey

Inventor

Gabriel W. McCoole.

By his Attorneys

Keller & Starck

UNITED STATES PATENT OFFICE.

GABRIEL W. McCOOLE, OF ST. LOUIS, MISSOURI.

CLOTHES-PIN.

SPECIFICATION forming part of Reissued Letters Patent No. 11,358, dated August 15, 1893.

Original No. 486,954, dated November 29, 1892. Application for reissue filed June 27, 1893. Serial No. 478,995.

*To all whom it may concern:*

Be it known that I, GABRIEL W. McCOOLE, a citizen of the United States, residing at St. Louis, in the State of Missouri, have invented certain new and useful Improvements in Clothes Pins or Holders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to clothes pins or holders of the class which comprise a piece of wire having a coil between its ends by which the pin is held on the line, said coil encircling the latter, and the clothes being held by having portions passed beneath the ends of the wires on both sides of the coil and the clothes line; and my object is to provide a device of this character which shall have increased efficiency both as to operation and extent of use.

To this end my invention consists in the clothes pin or holder constructed as hereinafter specified and claimed, and shown in the drawings, in which—

Figure 2:
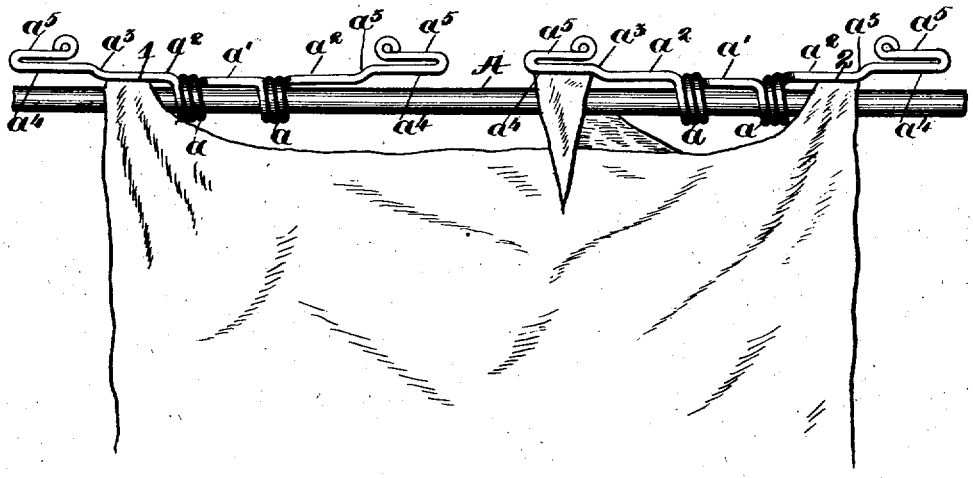

Figure 1 is a perspective view of my device, and Fig. 2 a side elevation showing two in place upon a line to illustrate the manner of using them.

In constructing my pin or holder a piece of wire of proper length is formed with two coils $a$ and $a$ apart from each other and connected by a preferably straight piece $a'$, and having each a straight extension $a^2$, that at $a^3$ is bent upward and the wire is then carried along at $a^4$ in a straight line in a plane higher than the extension $a^2$, its end being bent back parallel with itself at $a^5$. The extension from one coil, while being in line with is in a direction opposite the other. The device thus constructed is held on a clothes line A by slipping the coils $a$ over the same, and when on the line the extensions $a^2$, $a^4$, and $a^5$ from each coil will lie parallel with the line.

To fasten or secure a garment to the line, two of the holders are used, and one corner of the garment is placed between the extension designated 1 (see Fig. 2) of one of the holders and the line, and another between the extension 2 of the other holder and the line. The two remaining extensions can be similarly used in connection with two other holders. For clothes of medium thickness the extension section or portion $a^2$ is used, while for thick clothes the extension section $a^4$ is used. For thin light pieces the portions $a^5$ are provided, such pieces as napkins, &c., being held simply by passing one corner between the portion $a^5$ and the section $a^4$. My holder is thus adapted for the three thicknesses of clothes.

The provision of the two separate coils $a$ and $a$ simultaneously encircling the line is very important, as thus each extension has its own bearing on the line, and when a piece of clothes is passed under it or it over the piece, the opposite extension will not be at all affected. With but one narrow coil serving as a bearing or support for both extensions inevitably when a piece is placed under one, it will be raised and the other depressed and placed under unusual tension or strain, making its use inconvenient if not difficult. This action will take place as the holder will rock on its coil as a fulcrum. With my construction however, this difficulty is wholly obviated, as the bearings or points of support of the two extensions are independent.

Having described my invention, what I claim is—

1. A clothes pin comprising two connected coils separated a suitable distance, and adapted to simultaneously encircle a line, and extensions projecting from each coil in opposite directions for co-operating with the line, substantially as set forth.

2. A clothes pin or holder comprising a coil of wire having an extension, which has two sections which lie in different planes, each to co-operate with the clothes line to hold clothes of different thicknesses, substantially as set forth.

3. A clothes pin or holder consisting of two coils of wire united by a straight piece and having each an extension comprising two straight sections which lie in different planes and adapted both to co-operate with a clothes line, substantially as set forth.

4. A clothes pin or holder consisting of two coils of wire united by an intermediate piece and having each an extension comprising two straight sections which lie in different planes and adapted both to co-operate with the clothes line, the terminal of each section being bent back upon itself, substantially as and for the purpose set forth.

In testimony whereof I affix my signature in the presence of two witnesses.

GABRIEL W. McCOOLE.

Witnesses:

JAMES J. O'DONOHOE,

EMIL STAREK.